United States Patent [19]

Horney

[11] 4,455,274
[45] Jun. 19, 1984

[54] METHOD OF PRODUCING A COMPOSITE WASHER ASSEMBLY

[75] Inventor: James R. Horney, Cockeysville, Md.
[73] Assignee: Black & Decker Inc., Newark, Del.
[21] Appl. No.: 406,087
[22] Filed: Aug. 6, 1982
[51] Int. Cl.³ .............................................. B29H 9/10
[52] U.S. Cl. .................................... 264/262; 249/93; 264/277; 264/278; 425/116; 425/124
[58] Field of Search .............. 264/262, 277, 278, 261; 425/116, 123, 124; 249/93; 248/634

[56] References Cited

U.S. PATENT DOCUMENTS

| | | |
|---|---|---|
| 1,386,988 | 8/1921 | Burlew . |
| 1,917,929 | 7/1933 | Duffy ........................... 264/277 |
| 2,094,823 | 10/1937 | Sample et al. .................. 425/123 |
| 2,187,350 | 1/1940 | Kuzmick . |
| 2,629,990 | 3/1953 | Tocci-Guilbert . |
| 2,633,008 | 3/1953 | Tocci-Guilbert . |
| 2,717,478 | 9/1955 | Blum . |
| 2,767,527 | 10/1956 | Tocci-Guilbert . |
| 2,767,528 | 10/1956 | Tocci-Guilbert . |
| 3,036,412 | 5/1962 | Tocci-Guilbert . |
| 3,238,287 | 3/1966 | Chapman ....................... 264/278 |
| 3,363,040 | 1/1968 | Aoki ............................ 264/278 |
| 3,814,777 | 6/1974 | Schmidt ........................ 264/278 |
| 4,067,184 | 1/1978 | Johnson, Jr. . |
| 4,073,858 | 2/1978 | Chung .......................... 264/262 |
| 4,427,615 | 1/1984 | Eskesen ........................ 264/278 |

FOREIGN PATENT DOCUMENTS

| | | | |
|---|---|---|---|
| 0053833 | 6/1982 | European Pat. Off. | .......... 264/261 |
| 2015913 | 9/1979 | United Kingdom | .......... 264/278 |

Primary Examiner—James B. Lowe
Attorney, Agent, or Firm—R. B. Sherer; H. Weinstein; Charles E. Yocum

[57] ABSTRACT

A method for producing an annular composite washer subassembly for use as a 'soft' mount for the abrasive disc subassembly of a portable grinder includes first and second relatively movable mold portions with each mold portion having a pair of spring-biased pins therein. A first flat annular washer having a pair of holes is placed over the pins in the first mold portion and a second annular flat washer having a pair of holes is placed over the pins in the second mold portion. The pins of the first mold portion extend through the holes of the first washer to engage the second washer, and, conversely, the pins of the second mold portion extend through the holes of the second washer to engage the first washer. The first and second washers are positionally maintained in their respective mold portions by the pins of the opposite mold portion while a plasticized plastic material is injected into the mold and allowed to solidify between the so-positioned washers to form the composite washer assembly.

21 Claims, 7 Drawing Figures

U.S. Patent    Jun. 19, 1984    4,455,274
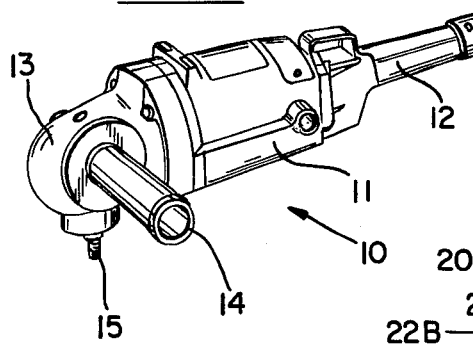
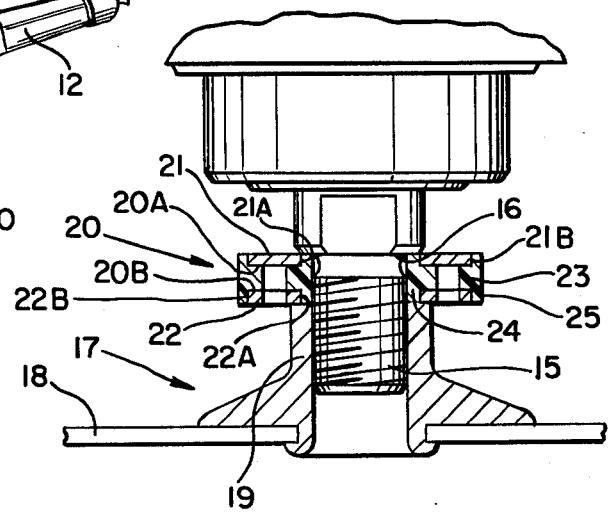
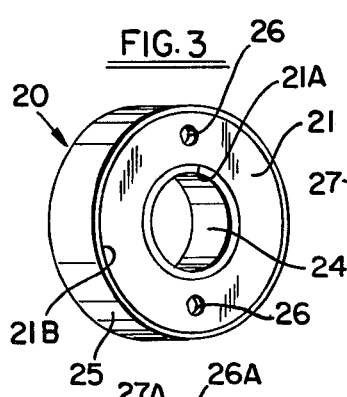
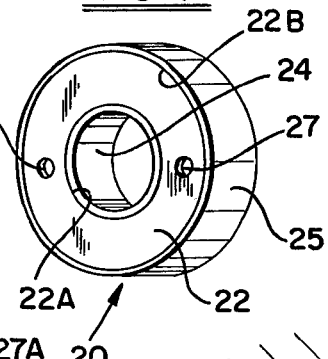
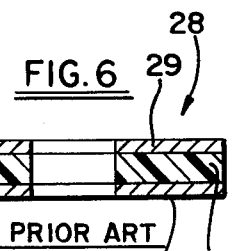
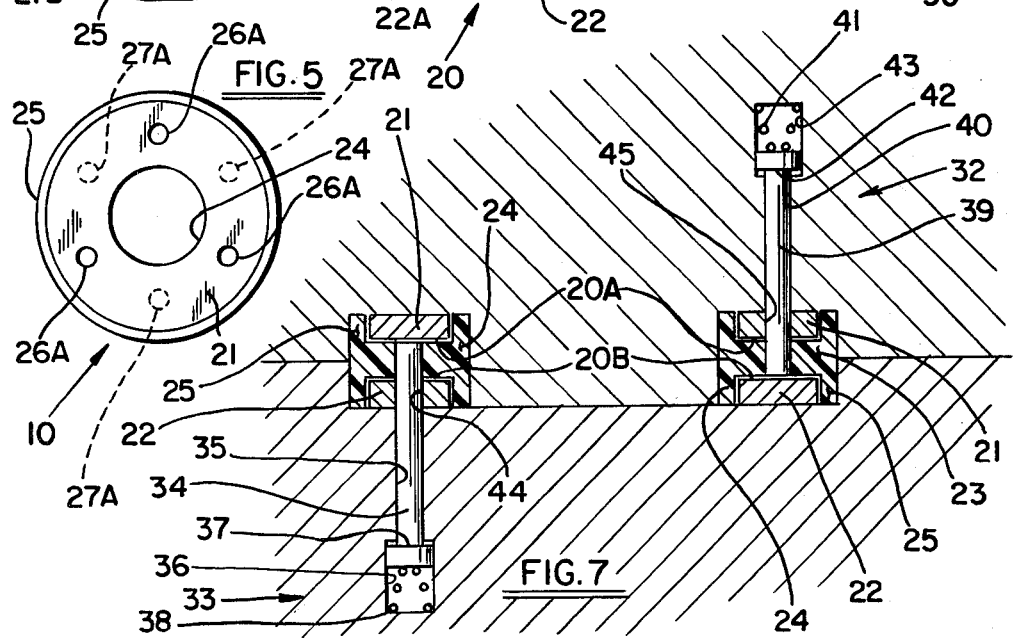

METHOD OF PRODUCING A COMPOSITE WASHER ASSEMBLY

CROSS-REFERENCE TO RELATED APPLICATION

The subject matter of this patent application is related to that disclosed in U.S. patent application Ser. No. 406,086, filed Aug. 6, 1982, for "A Composite Washer Assembly", and assigned to the assignee of the present invention.

FIELD OF THE INVENTION

The present invention relates to the method of producing an annular composite washer assembly for a power tool, and more particularly, to the method of producing a precision washer assembly used as a "soft" mount for the abrasive disc subassembly of a portable electric grinder.

BACKGROUND OF THE INVENTION

In the aforesaid co-pending application, Ser. No. 406,086, there is disclosed an annular composite washer assembly which provides a "soft" mount for the abrasive disc subassembly mounted on the threaded output spindle of a portable grinder. The composite washer assembly, which is disposed coaxially between the abrasive disc subassembly and an annular shoulder on the spindle, includes a pair of flat annular washers and a molded plastic body therebetween. The body has integrally-molded inner and outer annular bands joined integrally with the inner and outer diameters of the respective washers. The inner annular band is threadably received over the output spindle, and the threads on the spindle "bite" into the relatively soft plastic material of the band. As a result, an economical integral component is provided for mounting the abrasive disc subassembly on the output spindle and preventing the subassembly from inadvertently locking or jamming against the shoulder on the spindle. This insures that the abrasive disc subassembly may be easily removed from the spindle.

SUMMARY OF THE INVENTION

It is an object of the present invention to provide an improved method for producing the annular composite washer assembly.

It is another object of the present invention to provide an improved method for producing the washer assembly, one which is economical yet results in an integral component.

In accordance with the teachings of the present invention, there is disclosed an improved method for precision molding a composite washer assembly, which method comprises the following steps: A mold is provided which includes a first portion and a second portion movable relative to the first portion. A first pair of substantially diametrically-opposed spring-loaded retractable pins is provided in the second portion of the mold. A first annular washer is further provided, having a first pair of substantially diametrically-opposed holes. This first washer is positioned in the first portion of the mold. A second pair of substantially diametrically-opposed spring-loaded retractable pins is provided in the first portion of the mold. This second pair of pins is circumferentially shifted with respect to the first pair of pins located in the second mold portion. A second annular washer is provided, having a second pair of substantially diametrically-opposed holes. This second washer is positioned in the second portion of the mold. With this arrangement, the first pair of pins protrudes through the respective holes in the second washer, and the second pair of pins protrudes through the respective holes in the first washer. When the mold portions are closed together, the first pair of pins engages the inner face of the first washer, and the second pair of pins engages the inner face of the second washer. As a result, the washers are accurately located to as to be substantially parallel to each other and substantially coaxial with respect to one another. A suitable compound is then introduced into the mold to form resilient means (or a body) integrally molded with the washers.

In accordance with the further teachings of the present invention, the washers are flat and are made of a suitable metal, while the molding material comprises a suitable plastic, such as polyurethane. The first mold portion (or half) is stationary, while the other mold portion (or half) is movable. The mold is arranged for integrally molding inner and outer annular bands on the molded body. These bands are preferably coterminous with the spaced washers and thus define the axial length or thickness of the washer assembly. The second pair of pins is shifted by approximately ninety degrees with respect to the first pair of pins. Each of the pins is retractable in its respective mold portion, as the mold portions are brought together, and abutment means is provided to prevent each spring-loaded pin from being ejected from its respective mold portion when the mold is opened.

These and other objects of the present invention will become apparent from a reading of the following specification, taken in conjunction with the enclosed drawings.

BRIEF DESCRIPTION OF THE DRAWINGS

FIG. 1 is a perspective view of a typical power tool to which the teachings of the present invention may be applied.

FIG. 2 is an elevational sectional detail view of the right-angle spindle of the tool shown in FIG. 1, showing the annular composite washer assembly of the present invention mounted thereon.

FIG. 3 is a front isometric view of the washer assembly.

FIG. 4 is a rear isometric view of the washer assembly.

FIG. 5 is a top plan view of another embodiment of the washer assembly.

FIG. 6 is an elevational sectional view of a fabricated assembly resorted to in the prior art.

FIG. 7 is an elevational sectional detail view of a 90° segment of a preferred mold for producing the washer assembly of the present invention.

DESCRIPTION OF THE PREFERRED EMBODIMENT

With reference to FIG. 1, there is illustrated a portable electric grinder 10 with which the teachings of the present invention may be applied. It will be appreciated by those skilled in the art, however, that the grinder 10 is only exemplary of a wide variety of power tools and other devices to which the invention may be applied. With this in mind, the grinder 10 generally comprises a motor housing 11, a switch handle 12, a gear case 13, an auxiliary handle 14, and a right-angle spindle 15 for mounting a grinding wheel subassembly or other tool element subassembly. With further reference to FIG. 2, the spindle 15 is externally threaded and has an annular shoulder 16 formed thereon. A tool element subassembly, or abrasive disc subassembly 17, is threadably mounted on the spindle 15. The abrasive disc subassembly 17 includes an abrasive disc 18 carried by an internally-threaded collar 19.

With reference to FIGS. 2, 3 and 4, an annular composite washer assembly 20 is disposed axially between the shoulder 16 on the spindle 15 and the collar 19 on the abrasive disc subassembly 17. This washer assembly 20 includes first and second flat annular washers 21 and 22, respectively, having substantially uninterrupted inner or opposing faces 20A and 20B. Preferably, the washers 20, 21 are made of a suitable metal. These washers 20, 21 are axially spaced relative to one another, and are substantially parallel to, and coaxially aligned with one another. Resilient means, or an annular body, 23 is disposed between the flat washers 21,22 and is integrally molded thereto. This body 23 is molded from a suitable plastic substance which is preferably thermoplastic polyurethane resin, although many suitable substances, including such elastomers as nylon resin, may be selected. The body 23 has an inner annular portion or band 24 extending radially inwardly therefrom and joined integrally to the respective inner diameters or interior perimeter surfaces 21A and 22A of the washers 21,22. The body 23 further has an outer annular portion or band 25 extending radially therefrom and joined integrally to the respective outer diameters or outer perimeter surfaces 21B and 22B of the washers 21, 22. The integral annular bands 24, 25 are concentric and preferably (but not necessarily) are coterminous with the outer faces of the respective washers 21, 22, thereby defining the axial length or thickness of the composite washer assembly 20. The inner band 24 engages the threaded spindle 15, and the threads on the spindle "bite" into the relatively-soft plastic material of the band 24. As shown in FIG. 2, the cross-section of one side of the washer assembly 20 is thus in the form of an "H".

With reference again to FIGS. 2, 3 and 4, the washer assembly 20 has a first pair of blind axial pockets 26 substantially diametrically opposed to one another. The pockets 26 extend through the first washer 21 and through the molded body 23 and terminate at the second washer 22. The washer assembly 20 further has a second pair of blind axial pockets 27 substantially diametrically opposed to one another and shifted circumferentially (preferably by approximately ninety (90) degrees) with respect to the first pair of pockets 26. The second pair of blind axial pockets 27 extend through the second washer 22 and through the molded body 23 and terminate at the first washer 21.

A second embodiment of the present invention is illustrated in FIG. 5. Here a first plurality of blind axial pockets 26A are spaced equidistantly from each other by an angular or circumferential distance of 120° (in the case of three pockets) and extends through the first washer 21, through the molded body 23, and terminates at the second washer 22. Similarly, a second plurality of blind axial pockets 27A extends through the second washer 22, through the molded body 23, and terminates at the first washer 21. Pockets 27A are also equidistantly spaced by an angular or circumferential distance of 120°, but are shifted circumferentially approximately 60° with respect to pockets 26A (again in the case of three pockets).

The prior art may be illustrated by the composite assembly 28 of FIG. 6. This assembly 28 merely consists of a pair of metal washers 29 and 30 adhesively joined to a rubber or plastic washer 31.

In accordance with the teachings of the present invention, and with reference to FIG. 7, there is illustrated a method for producing the annular composite washer assembly 20 of the present invention. The method uses a mold comprising a stationary mold half or first portion 32 and a movable mold half or second portion 33. A first pair of retractable pins, one of which is shown at 34, is mounted in the movable portion 33 of the mold. The pins 34, which are substantially diametrically opposed to one another, are slidably mounted in respective bores 35. A counterbore 36 communicates with the bore 35 and forms an abutment for cooperating with a shoulder 37 formed on the pin, thereby preventing the pin from being ejected out of the mold portion 33 (when the mold is opened). A spring 38 is trapped within each counterbore 36 and constantly urges the pin 34 towards the abutment. A second pair of diametrically-opposed spring-loaded retractable pins, one of which is shown at 39, is mounted in respective bores 40 in the stationary portion 32 of the mold. These pins 39 are resiliently biased by springs 41 and have shoulders 42 cooperating with abutments formed by communicating counterbores 43, thereby preventing the pins 39 from being ejected from the stationary portion 32 of the mold (when the mold is opened). The second pair of pins 39 is shifted circumferentially (preferably by ninety (90) degrees) with respect to the first pair of pins 34. The first pins 34 project through respective holes 44 in the second washer 22, and through the molded body 23, and engage the inner face 20A of the first washer 21. Similarly, the second pins 39 project through holes 45 in the first washer 21 and through the molded body 23 to engage the inner face 20B of the second washer 22. The pins 34 and 39 accurately position the washers 21 and 22 in the mold, coaxially with one another. The pins 34 and 39 also minimize the amount of flash generated between the mold portions 32, 33. It will be appreciated, of course, that these pairs of pins 34, 39, respectively, form the respective pairs of blind axial pockets 26, 27 in the composite washer assembly 20. The pins 34, 39 are retractable when the mold portions 32, 33 are brought together, and the springs 38, 41 provide the proper resilient loading on the pins without interfering with the positioning or locating of the washers 21, 22 in the mold.

With the structure of this mold in mind, and again referring to FIG. 7, the steps for molding the composite washer assembly 20 are as follows: The first washer 21 is positioned in the first portion 32 of the mold such that the second pair of pins 39 protrude through the holes 45 in the first washer 21. Similarly, the second washer 22 is positioned in the second portion 33 of the mold such that the first pair of pins 34 protrude through the holes 44 in the second washer 22. The mold portions 32, 33 are closed together, thereby positioning the washers 21, 22 coaxially and substantially parallel in the mold.

A plasticated or molten plastic substance, such as a thermoplastic, is introduced under pressure into the mold between the washers 21, 22 and forms the annular bands 24, 25 around the inner and outer diameters 21A, 21A and 22A, 22B, of the washers 21, 22. The thermoplastic is at a temperature in the range of from 320° F. to 450° F. when inroduced into the mold. The thermoplastic is allowed to solidify in the mold for approximately 45 seconds or longer. Then the mold portions 32, 33 are opened and the now-integral composite washer assembly 20 is removed.

It should be noted that the order in which the washers 21, 22 are positioned in the mold may be reversed, such that the second washer 22 may be positioned in the second portion 33 before the first washer 21 is positioned in the first portion 32.

The steps in the method of assembling the second embodiment of the composite washer assembly 20 of the present invention (FIG. 5) are substantially the same as those previously described for the first embodiment. Again, referring to FIG. 7, the mold need be modified only slightly, essentially by providing three sets of cooperating pins 34, bores 35, counterbores 36, shoulders 37 and springs 38 in the movable mold portion 33, the three sets being spaced circumferentially from each other by approximately 120°. Likewise, three sets of pins 39, bores 40, counterbores 43, shoulders 42, and springs 41 are provided in the stationary mold portion 32. These three sets are also spaced circumferentially from each other, approximately 120°, but are shifted circumferentially approximately 60° from their respective counterparts in the movable mold portion 33.

It will be appreciated that the pins 39, 34, respectively, form the blind axial pockets 26A, 27A in the second embodiment of the present invention illustrated in FIG. 5. This second embodiment permits additional accurracy, if desired, in the spacing of the washers 21, 22, because the washers 22, 22 are supported at additional points during the molding process.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. The method of molding a composite washer assembly, comprising the steps of: providing a mold including a first portion and a second portion movable relative to the first portion, providing a first plurality of circumferentially spaced resiliently biased pins in the second portion of the mold, providing a second plurality of circumferentially spaced resiliently biased pins in the first portion of the mold, the second plurality of pins being circumferentially shifted with respect to the first plurality of pins, providing a first annular washer having an inner face and a first plurality of circumferentially spaced holes matching the circumferential spacing of the second plurality of pins, positioning the first washer in the first portion of the mold such that the second plurality of pins protrudes through the respective holes in the first washer, providing a second annular washer having an inner face and a second plurality of circumferentially spaced holes matching the circumferential spacing of the first plurality of pins, positioning the second washer in the second portion of the mold such that the first plurality of pins protrudes through the respective holes in the second washer, closing the mold portions together, to cause the first plurality of pins to engage the inner face of the first washer, and the second plurality of pins to engage the inner face of the second washer, thereby positioning the first and second washers in the mold such that the washers are substantially parallel and coaxial with respect to one another, and introducing a plastic substance into the mold between the first and second washers to form a body integrally molded with the washers, the first and second plurality of pins maintaining the washers in position during introduction of the plastic substance into the mold.

2. The method of claim 1, wherein the first mold portion is stationary and wherein the second mold portion is movable.

3. The method of claim 1, wherein the washers are made of a suitable metal.

4. The method of claim 1, wherein the plastic substance comprises a thermoplastic polyurethane resin.

5. The method of claim 1, wherein the plastic substance comprises a nylon resin.

6. The method of claim 1, wherein the plastic substance comprises an elastomer.

7. The method of claim 1, wherein the mold is shaped to cause the plastic substance to form an inner annular band joining the respective inner diameters of the washers.

8. The method of claim 1, wherein the mold is shaped to cause the plastic substance to form an outer annular band joining the respective outer diameters of the washers.

9. The method of claim 1, wherein the second plurality of pins is circumferentially shifted by approximately sixty degrees with respect to the first plurality of pins.

10. The method of claim 1, wherein each pin is slidably retractable in its respective mold portion, as the mold portions are brought together, and wherein means are provided for preventing each resiliently biased pin from being ejected from is respective mold portion as the mold is opened.

11. The method of claim 10, wherein said means for preventing each pin from being ejected comprises a shoulder on the pin and a cooperating abutment in the mold.

12. The method of claim 1, wherein a plasticated thermoplastic substance is introduced into the mold at a temperature ranging from 320° F. to 450° F.

13. The method of claim 12, further comprising the step of allowing the plasticated thermoplastic to solidify.

14. The method of claim 13, wherein the plasticated thermoplastic is allowed to solidify for approximately 45 seconds or longer.

15. The method of claim 13, further comprising the steps of separating the mold portions and removing the composite washer assembly.

16. The method of claim 1, wherein the step of positioning the first washer in the first portion of the mold occurs prior to the step of positioning the second washer in the second portion of the mold.

17. The method of molding a composite washer assembly, comprising the steps of: providing a mold including a first portion and a second portion movable relative to the first portion, providing a first pair of substantially diametrically opposed spring-loaded pins in the second portion of the mold, providing a second pair of substantially diametrically opposed spring-loaded pins in the first portion of the mold, the second pair of pins being circumferentially shifted with respect to the first pair of pins, providing a first annular washer having an inner face and a first pair of substantially diametrically opposed holes, positioning the first washer in the first portion of the mold such that the second pair of pins protrudes through the respective holes in the first washer, providing a second annular washer having an inner face and a second pair of substantially diametrically opposed holes, positioning the second washer in the second portion of the mold such that the first pair of pins protrudes through the respective holes in the second washer, closing the mold portions together to cause the first pair of pins to engage the inner face of the first washer, and the second pair of pins to engage the inner face of the second washer, thereby positioning the washers in the mold so that the washers are substantially parallel and coaxial with respect to one another, and introducing a plastic substance into the mold between the first and second washers to form a body integrally molded with the washers, the first and second pair of pins maintaining the washers in position during introduction of the plastic substance into the mold.

18. The method claimed in claim 17, wherein the second pair of pins is shifted circumferentially by approximately ninety degrees with respect to the first pair of pins.

19. The method claimed in claim 1, wherein the resiliently biased pins of the first plurality of resiliently biased pins are circumferentially equispaced relative to one another.

20. The method claimed in claim 1, wherein the resiliently biased pins of the second plurality of resiliently biased pins are circumferentially equispaced relative to one another.

21. The method claimed in claim 1, wherein the resiliently biased pins are each biased by a spring member.

* * * * *